United States Patent
Yuyama et al.

[11] Patent Number: 5,875,610
[45] Date of Patent: Mar. 2, 1999

[54] DRUG PACKAGING DEVICE

[75] Inventors: Shoji Yuyama; Hiroyasu Hamada, both of Toyonaka, Japan

[73] Assignee: Kabushiki Kaisha Yuyama Seisakusho, Osaka, Japan

[21] Appl. No.: 879,655

[22] Filed: Jun. 20, 1997

[30] Foreign Application Priority Data

Jun. 26, 1996 [JP] Japan .................................. 8-165591

[51] Int. Cl.$^6$ .............................. B65B 9/08; B65B 57/12
[52] U.S. Cl. ................................ 53/75; 53/168; 53/374.4; 53/550; 53/562
[58] Field of Search ............................... 53/75, 55, 374.4, 53/493, 500, 477, 475, 550, 548, 168, 237, 238, 562, 155, 154

[56] References Cited

U.S. PATENT DOCUMENTS

| | | | |
|---|---|---|---|
| 5,097,652 | 3/1992 | Inamura et al. .......................... | 53/168 X |
| 5,481,855 | 1/1996 | Yuyama ................................. | 53/168 X |
| 5,678,393 | 10/1997 | Yuyama et al. ........................ | 53/168 X |
| 5,722,215 | 3/1998 | Yuyama ................................. | 53/75 X |
| 5,787,678 | 8/1998 | Kolke et al. ........................... | 53/168 X |

*Primary Examiner*—James F. Coan
*Attorney, Agent, or Firm*—Wenderoth, Lind & Ponack, L.L.P.

[57] ABSTRACT

In a drug packaging device which can shorten the drug packaging time. The opening of a bag is sealed with a transverse sealing unit and a longitudinal sealing unit. The time when the sealing is started and the sealing speed are varied according to the type of drug to be packaged in the bag. For drugs that take a longer time to be fed into the bag and settle in the bag, the seal starting time is delayed and the sealing speed is slowed. As a whole, it is possible to shorten the packaging time, while eliminating the possibility of incomplete packaging.

23 Claims, 5 Drawing Sheets

DRUG PACKAGING DEVICE

BACKGROUND OF THE INVENTION

This invention relates to a drug packaging device for packaging prescribed drugs in bags or containers.

A drug packaging device is used to package prescribed drugs in bags or containers by putting drugs in each bag or container through a hopper inserted in the mouth of the bag or container and heat-sealing the mouth.

Drugs to be packaged come in a great variety of types and shapes, and the time needed for drugs discharged from drug feeders to pass through guides and the hopper and be delivered into each bag or container varies greatly from one type of drugs to another. In order to package all the necessary drugs in the respective bags or containers, the bags or containers are sealed after the drugs which take the longest time to reach the bags or containers have been put in the bags or containers.

Drugs are roughly classified into tablets, powder drugs and liquid drugs. Some of them need a longer time to be fed into a bag or container than others. For example, spherical tablets bounce in a bag or container and thus take a longer time to settle therein than tablets of an ordinary shape or capsules. Also, fine powder drugs tend to scatter like smoke in containers or bags and thus take a longer time to settle than granular drugs. In the case of liquid drugs, the higher their viscosity, the slower their flow speed, and thus the longer time needed for them to flow into a bag or container.

Since there is a wide difference in the times needed for drugs to be fed into bags and settle, from one type of drug to another, the speed with which the mouths of the bags or containers are sealed is set according to the drug that takes the longest time to be fed into containers and settle, so as to prevent incomplete packaging.

Thus, the seal starting time is unnecessarily delayed and the sealing speed is unnecessarily slow.

An object of this invention is to streamline the packaging operation of a drug packaging device to shorten the packaging time.

SUMMARY OF THE INVENTION

According to this invention, the speed at which the opening of each bag or container is sealed is varied according to the type of drug to be packaged in the bag or container. The time when the sealing of the mouth of each bag or container is started may also be varied according to the type of drug to be packaged in the bag or container.

According to this invention, the sealing speed is slowed for drugs that take a longer time to be fed into a bag or container and settle therein. Also, the seal starting time is delayed for drugs that take a longer time to be fed into a bag or container and settle therein. This makes it possible to package drugs most efficiently, while eliminating the possibility of incomplete packaging.

Other features and objects of the present invention will become apparent from the following description made with reference to the accompanying drawings, in which:

DETAILED DESCRIPTION OF THE PREFERRED EMBODIMENT

An embodiment of the drug packaging device according to this invention is now described with reference the accompanying drawings.

Figure 1:
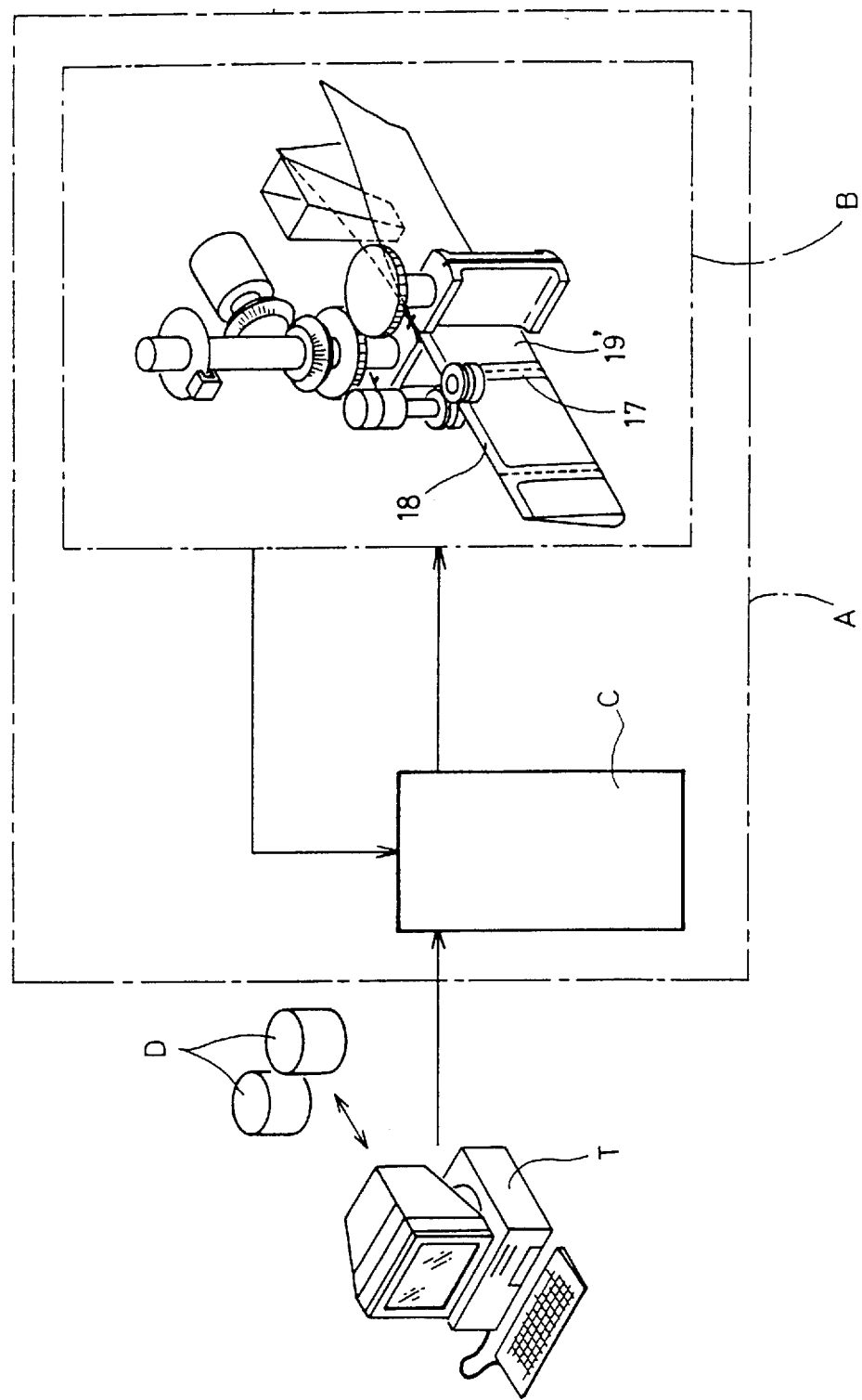
FIG. 1 is a block diagram of the drug packaging device according to this invention.

Referring first to FIG. 1, the drug packaging device A comprises a drug packaging unit B, and a control unit C for controlling the packaging unit B based on drug information supplied from a computer T.

Figure 2:
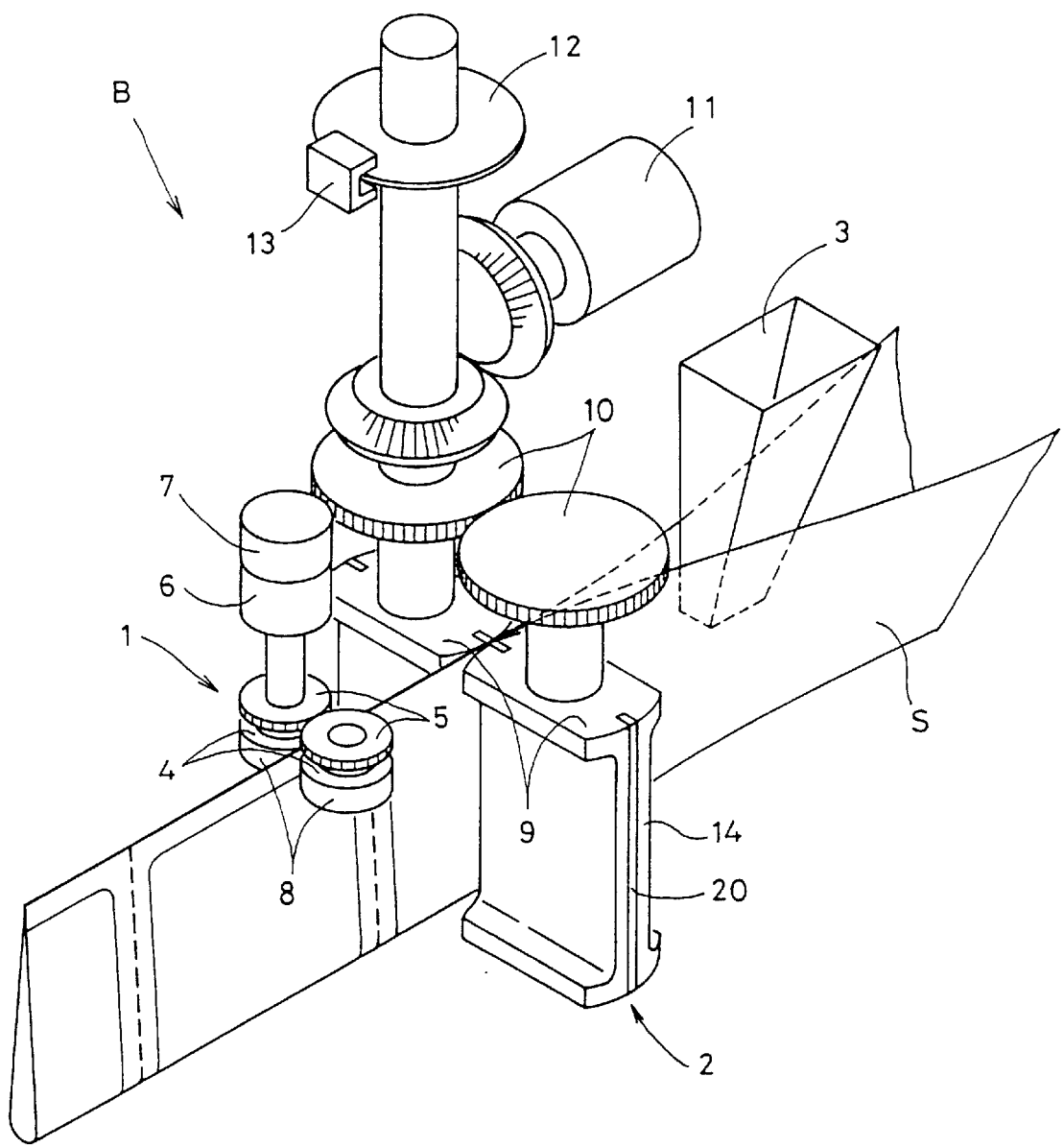
FIG. 2 is an enlarged perspective view of a packaging unit.

As shown in FIG. 2, the packaging unit B comprises a longitudinal heat sealer 1 for continuously heat-sealing the longitudinal edges of a long web of packaging sheet S which has been longitudinally folded in half, a transverse heat sealer 2 for heat-sealing the packaging sheet S along longitudinally spaced transverse lines, and a hopper 3 for supplying predetermined drugs into the folded sheet S.

The longitudinal heat sealer 1 comprises a pair of heat rollers 4 pressed against each other with the longitudinal edges of the sheet S therebetween and having coaxial gears 5 in mesh with each other, a motor 6 for driving one of the gears 5, a sensor 7 for detecting the rotating speed and rotating speed variation of the motor 6.

The heat rollers 4, each having an outer peripheral surface as a sealing surface 8, are rotated by the motor 6 to continuously heat-seal the sheet S along its side edges.

The control unit C controls the timing of starting the motor 6 and its rotating speed based on the information on rotation of the motor detected by the sensor 7.

The transverse heat sealer 2 includes a pair of heat rollers 9 extending over the entire width of the folded sheet S and pressed against each other with the sheet S therebetween, gears 10 mounted coaxially on the rollers 9 so as to mesh with each other, a motor 11 for driving one of the gears 10 through bevel gears, a disk-shaped code plate 12 coaxially mounted on a shaft on which is mounted said one of the gears 10, and a sensor 13 for detecting the rotating condition of the transverse heat rollers 9.

Each heat roller 9 has a pair of diametrically opposite vertical sealing surfaces 14 adapted to align with the sealing surfaces 14 of the other roller 9 as the rollers 9 rotate. By rotating the rollers 9 with the motor 11, the sheets are heat-sealed along longitudinally spaced transverse lines.

The control unit C controls the timing of starting the motor 11 and its rotating speed. The sensor 13 detects the rotating speed of the heat rollers 9 and the positions of the sealing surfaces 14 by reading codes impressed on the code plate 12. The information thus detected is sent to the control unit C and used to control the motor 11.

Figure 3:
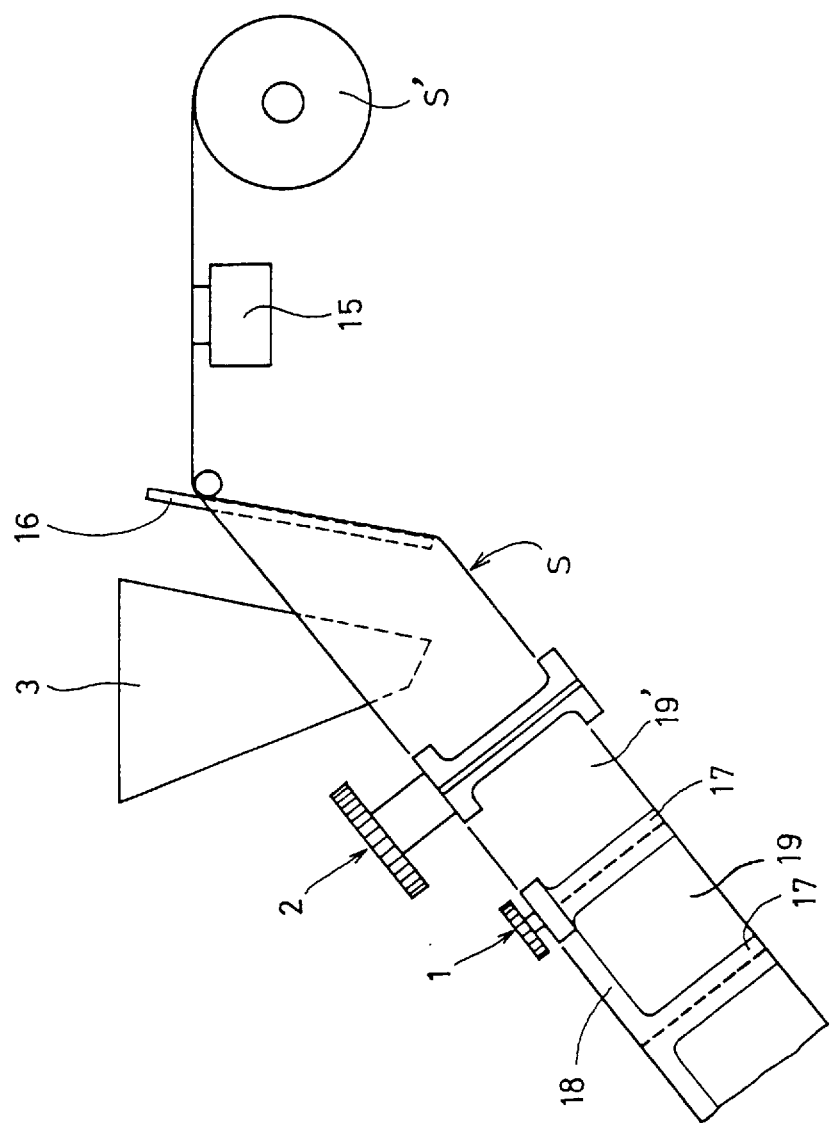
FIG. 3 is a side view of the packaging unit of FIG. 2.

As seen in FIG. 3, the hopper 3 is provided downstream of the longitudinal heat sealer 2. The sheet is pulled out of a roll S', and after necessary information is printed thereon by a printer 15, it is folded in half by a triangular plate 16 to define a space 19' into which drugs are dropped from the hopper 3. In this state, the space 19' has its front side closed by a transverse seal line 17. When all the necessary drugs have been put in this space 19', a longitudinal seal line 18 and a rear transverse seal line 17 are formed by the heat sealers 1 and 2, respectively, to hermetically seal the space 19' to form a drug bag 19. Perforations are formed on every transverse seal line 17 by perforating blades 20 (FIG. 2)

provided on the sealing surfaces 14 of the heat rollers 9, so that any adjacent bags 19 can be separated from each other along the perforations.

Referring to FIG. 1, the control unit C receives, on-line, information on drugs to be packaged from a data base D through the computer T, and controls, based on the information received, the timing of starting the motors 6 and 11 and their rotating speeds. Such information on drugs includes the names and kinds of the drugs to be packaged in each bag, the time needed for the drugs to drop into the bag 19', and the time needed for the drugs to settle in the bag 19'.

For drugs that can be delivered and settle quickly in the bag, the control unit C starts the heat rollers 4 and 9 more quickly and rotates them at higher speeds to package each kind of drug in a minimum time period. For drugs taking more time, slower timing and slower speeds are set. This insures packaging at optimum speeds for particular drugs, thus eliminating the possibility of leaving any drug unpacked.

The drug information may be entered, on-line, from a host computer in a hospital or manually from the computer T.

The drug packaging device A may have selection switches that select the types of drugs such as fine powder, powder and granules so that the seal starting time and the sealing speed can be changed according to the drug type.

A drug stocker for storing drugs to be prescribed may have a memory which can store information on drugs stored in the stocker, and a transmitter for transmitting the information in the memory so that when the stocker is moved close to the drug packaging device A, the drug information stored in the memory of the stocker is transmitted automatically to the drug packaging device A.

A scanner may be used to read bar codes or human-legible letters on prescriptions and enter drug names and other necessary information in the computer T or the drug packaging device A. Or else a bar code reader may be used to read bar codes on prescriptions and enter drug information.

Prescription data from the host computer may be displayed on a display means at the prescription station and, when prescribing drugs on the basis of the data, the data may be automatically stored in a container for drugs so that when this container is moved close to the drug packaging device A or the computer T, the prescription data stored is transferred to the control unit C.

If a plurality of kinds of drugs are to be packaged in a single bag 19, the control unit gathers the prescription data for these drugs and rotates the motors 6 and 11 at speeds in conformity with the latest and slowest ones of the seal starting times and sealing speeds set for these drugs to seal the opening of the bag 19'.

The operation of a powder drug packaging machine provided with the drug packaging device A of this embodiment is now described with reference to the flowchart of FIG. 4.

Figure 4:
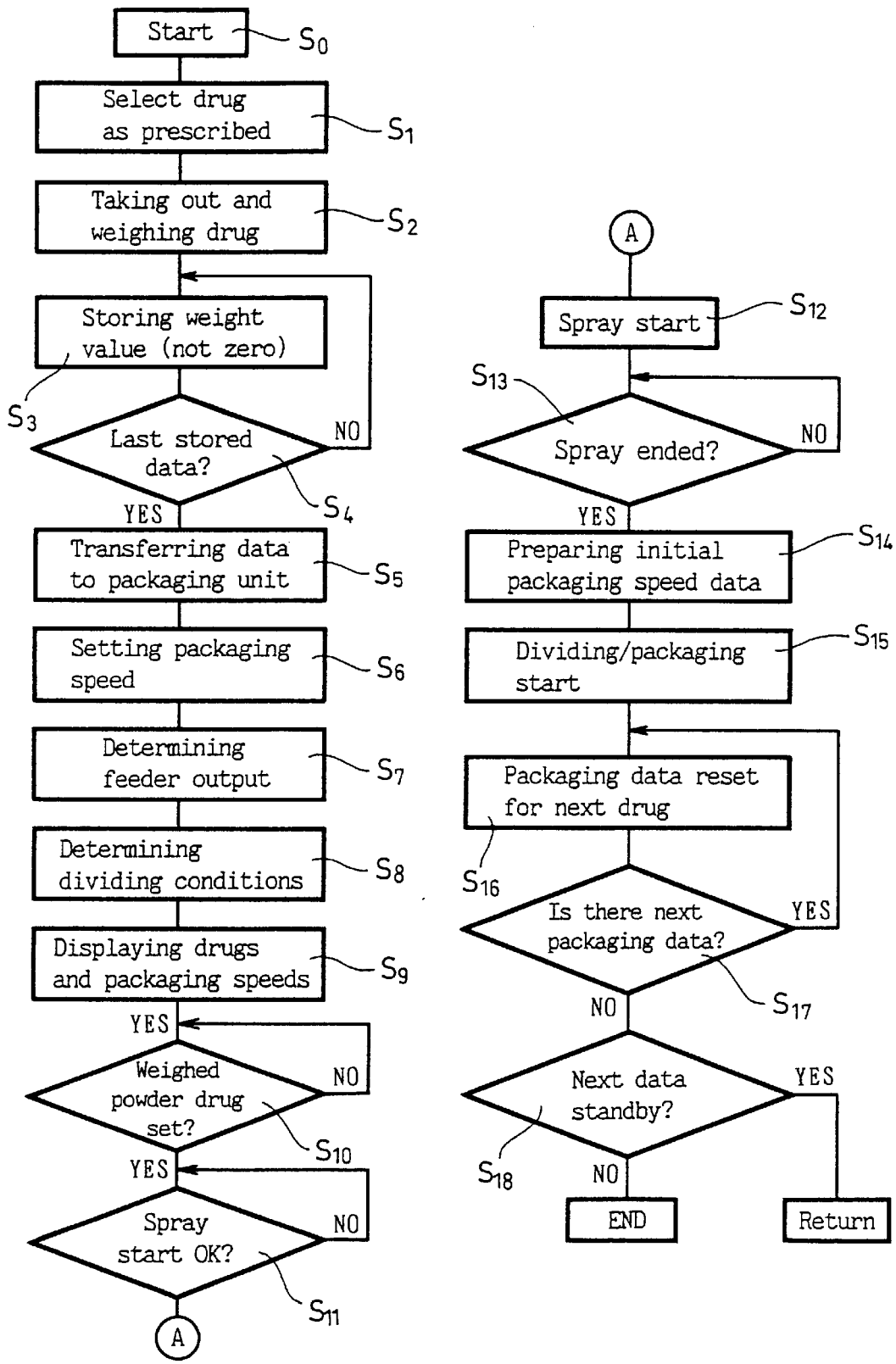
FIG. 4 is a flowchart showing the operation of a powder drug packaging machine.

As shown in FIG. 4, a powder drug stocker in which is stored a prescribed powder drug is selected, and powder drug is taken out of this stocker and weighed by the prescribed amount (S0, S1 and S2). The weight value (other than zero) of the drug that is stable for a predetermined time is stored in the weighing scale (S3). If, thereafter, the scale indicates zero continuously zero for a given period of time, the weight value previously stored in the scale is used as the weight data (S4). This way, all the prescribed powder drugs are weighed (S3, S4).

The weight data are then transferred to the packaging unit (S5). Based on the seal starting times and sealing seeds for all the powder drugs, packaging speeds are determined in the manner described below (S6). Also, the feeder outputs and dividing conditions are determined (S7, S8). These data are displayed on a panel (S9).

Then, the control unit determines if the weighed powder drug has been set and if the drug thus set is sprayable (S10, S11), and sprays the set and sprayable drug (S12).

During spraying, the control unit checks intermittently if the spraying has ended (S13). When the spraying has ended, preparation is made for packaging the powder drug to be packaged first at the predetermined packaging speed, which is determined based on the seal starting time and sealing speed for this drug (S14). Powder drug is divided into a plurality of portions, each having a predetermined weight being put into bags 19', and the bags 19' are packaged at the predetermined packaging speed (S15).

If the drug is a coarse one such as granules, it is less likely to scatter like smoke when it is scraped from the dividing dish with a scraping rotor. Thus, in this case, the seal starting time is quickened and the sealing speed is set higher. Specifically, granular drugs can be packaged at a high rate of 60 bags a minute. If the drug is a fine powder, it will scatter like smoke on the dividing dish and in the bags 19'. Thus, in such a case, the seal starting time is delayed and the sealing speed is slowed. Specifically, fine powder drug is packaged at the rate of about 30 bags a minute. By changing the packaging speed according to drug types, it is possible to prevent incomplete packaging due to the fact that scattered powder drug is trapped in the seal portions 17, 18, while minimizing the packaging time.

Every time the drug type changes, the packaging speed is reset for the next powder drug (S16). This step is repeated until all the necessary powder drugs are packaged. When this is done, the control unit checks if there is data about the next prescription.

Figure 5:
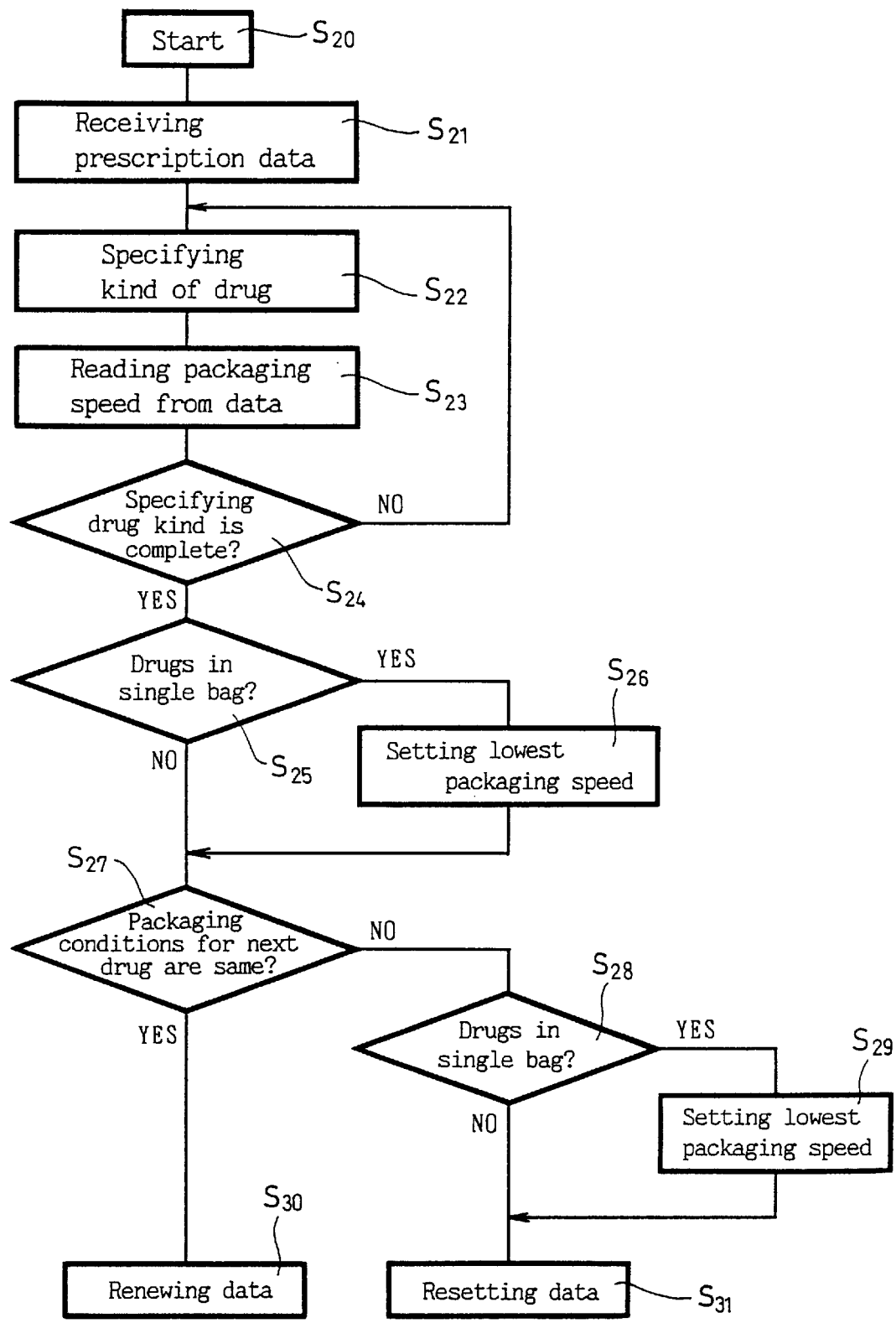
FIG. 5 is a flowchart showing how the packaging speed is set.

FIG. 5 shows a flowchart showing an example of the packaging speed setting procedure.

Firstly, prescription data are entered manually or by a scanner or a bar code reader in a host computer or the computer T to specify the kinds of drugs to be packaged (S20, S21, S22).

Drug information on the specified drugs is selected from drug type data that are stored in a data base of the host computer or in a non-volatile memory of the computer T. From the selected drug information, the packaging speeds are read out (S23) for all the drugs listed in the prescription (S24).

The control unit checks if a plurality of kinds of drugs are in a single bag 19' (S25). If so, the slowest one of the packaging speeds set for the plurality of kinds of drugs is selected (S29). The control unit then checks if the packaging speeds for the drugs to be packaged are the same, and if not, checks again if these drugs are packaged in a single bag (S28). If they are, the packaging speed is reset (S29, S31). If the packaging speed setting is unchanged, auxiliary data such as drug names are renewed.

In the embodiment, drugs are packaged in bags. But if drugs to be packaged are liquid drugs, they are packaged in ampules or plastic bottles.

The drug packaging device according to the present invention can package drugs in the shortest possible time while eliminating the possibility of incomplete packaging.

What is claimed is:

1. A drug packaging device for packaging predetermined drugs in bags by feeding said predetermined drugs into said bags through their openings and sealing the openings to close said bags, characterized in that the sealing speed at which the opening of each bag is sealed is varied according to the type of drug to be packaged in said each bag.

2. A drug packaging device as claimed in claim 1 wherein the time when the sealing of the mouth of each bag is started is varied according to the type of drug to be packaged in said each bag.

3. A drug packaging device as claimed in claim 1 wherein said seal starting time and said sealing speed are determined based on drug information supplied from a computer.

4. A drug packaging device as claimed in claim 1 wherein said seal starting time and said sealing speed are determined based on externally supplied information on the shape of the drug to be packaged.

5. A drug packaging device as claimed in claim 1 wherein said seal starting time and said sealing speed are determined based on drug information supplied from a drug stocker.

6. A drug packaging device as claimed in claim 1 wherein said seal starting time and said sealing speed are determined based on drug information recorded on a prescription and read by a scanner or a bar code reader.

7. A drug packaging device as claimed in claim 1 wherein if a plurality of kinds of drugs are fed into a single bag, the opening of said single bag is sealed at the latest of seal starting times or the slowest of sealing speeds set for said plurality of kinds of drugs.

8. A drug packaging device as claimed in claim 7 wherein if a plurality of kinds of drugs are to be continuously packaged, a seal starting time and a sealing speed are set for each of said plurality of kinds of drugs, and wherein the sealing of the opening of each bag is started at said seal starting time and carried out at said sealing speed.

9. A drug packaging device as claimed in claim 2, wherein said seal starting time and said sealing speed are determined based on drug information supplied from a computer.

10. A drug packaging device as claimed in claim 2, wherein said seal starting time and said sealing speed are determined based on externally supplied information on the shape of the drug to be packaged.

11. A drug packaging device as claimed in claim 2 wherein said seal starting time and said sealing speed are determined based on drug information supplied from a drug stocker.

12. A drug packaging device as claimed in claim 2 wherein said starting time and said sealing speed are determined based on drug information recorded on a prescription and read by a scanner or a bar code reader.

13. A drug packaging device as claimed in claim 2 wherein if a plurality of kinds of drugs are fed into a single bag, the opening of said single bag is sealed at the latest of seal starting times or the slowest of sealing speeds set for said plurality of kinds of drugs.

14. A drug packaging device as claimed in claim 3 wherein if a plurality of kinds of drugs are fed into a single bag, the opening of said single bag is sealed at the latest of seal starting times or the slowest of sealing speeds set for said plurality of kinds of drugs.

15. A drug packaging device as claimed in claim 4 wherein if a plurality of kinds of drugs are fed into a single bag, the opening of said single bag is sealed at the latest of seal starting times or the slowest of sealing speeds set for said plurality of kinds of drugs.

16. A drug packaging device as claimed in claim 5 wherein if a plurality of kinds of drugs are fed into a single bag, the opening of said single bag is sealed at the latest of seal starting times or the slowest of sealing speeds set for said plurality of kinds of drugs.

17. A drug packaging device as claimed in claim 6 wherein if a plurality of kinds of drugs are fed into a single bag, the opening of said single bag is sealed at the latest of seal starting times or the slowest of sealing speeds set for said plurality of kinds of drugs.

18. A drug packaging device as claimed in claim 2 wherein if a plurality of kinds of drugs are to be continuously packaged, a seal starting time and a sealing speed are set for each of said plurality of kinds of drugs, and wherein the sealing of the opening of each bag is started at said seal starting time and carried out at said sealing speed.

19. A drug packaging device as claimed in claim 3 wherein if a plurality of kinds of drugs are to be continuously packaged, a seal starting time and a sealing speed are set for each of said plurality of kinds of drugs, and wherein the sealing of the opening of each bag is started at said seal starting time and carried out at said sealing speed.

20. A drug packaging device as claimed in claim 4 wherein if a plurality of kinds of drugs are to be continuously packaged, a seal starting time and a sealing speed are set for each of said plurality of kinds of drugs, and wherein the sealing of the opening of each bag is started at said seal starting time and carried out at said sealing speed.

21. A drug packaging device as claimed in claim 5 wherein if a plurality of kinds of drugs are to be continuously packaged, a seal starting time and a sealing speed are set for each of said plurality of kinds of drugs, and wherein the sealing of the opening of each bag is started at said seal starting time and carried out at said sealing speed.

22. A drug packaging device as claimed in claim 6 wherein if a plurality of kinds of drugs are to be continuously packaged, a seal starting time and a sealing speed are set for each of said plurality of kinds of drugs, and wherein the sealing of the opening of each bag is started at said seal starting time and carried out at said sealing speed.

23. A drug packaging device as claimed in claim 7 wherein if a plurality of kinds of drugs are to be continuously packaged, a seal starting time and a sealing speed are set for each of said plurality of kinds of drugs, and wherein the sealing of the opening of each bag is started at said seal starting time and carried out at said sealing speed.

\* \* \* \* \*